(12) United States Patent
Xu et al.

(10) Patent No.: US 8,600,994 B1
(45) Date of Patent: Dec. 3, 2013

(54) PERFORMING AN OUTER JOIN BETWEEN A SMALL TABLE AND A LARGE TABLE

(75) Inventors: Yu Xu, San Diego, CA (US); Olli Pekka Kostamaa, Santa Monica, CA (US)

(73) Assignee: Teradata US, Inc., Dayton, OH (US)

( * ) Notice: Subject to any disclaimer, the term of this patent is extended or adjusted under 35 U.S.C. 154(b) by 339 days.

(21) Appl. No.: 12/874,439

(22) Filed: Sep. 2, 2010

(51) Int. Cl.
*G06F 17/30* (2006.01)

(52) U.S. Cl.
CPC ................. *G06F 17/30017* (2013.01)
USPC ........................................................ 707/737

(58) Field of Classification Search
USPC .................. 707/714, 737, 764, 796
See application file for complete search history.

(56) References Cited

U.S. PATENT DOCUMENTS

| 7,941,424 | B2 * | 5/2011 | Xu et al. | ................ | 707/714 |
| 2009/0299956 | A1 * | 12/2009 | Xu et al. | ................ | 707/2 |
| 2010/0082600 | A1 | 4/2010 | Xu et al. | | |

OTHER PUBLICATIONS

Jens-Peter Dittrich et al., Progressive Merge Join: A Generic and NonBlocking SortBased Join Algorithm, 2002, ACM, 12 pages.*
Larson, Per-Ake et al., "View matching for outer-join views", *The VLDB Journal* (2007), 29-53.
Hill, Gerhard et al., "Reducing outer joins", *The VLDB Journal* (2009), 599-610.
Bhargava, Gautam et al., "Simpification of outer joins", *CASCON '95: Proceedings of the 1995 conference of the Centre for Advanced Studies on Collaborative Research*, (1995),1-13.
Bhargava, Gautam et al., "Efficient processing of outer joins and aggregate functions", *IEEE 1996*, 441-440.
Bhargava, Gautam et al., "Hypergraph based reorderings of outer join queries with complex predicates", *SIGMOD Conference*, 1995, 304-315.
Larson, Per-Ake et al., "Efficient Maintenance of Materialized Outer-Join Views", *ICDE*, 2007, 56-65.
Chen, Arbee L., "Outerjoin Optimization in Multidatabase Systems", *DPDS '90: Proceedings of the second international symposium on Databases in parallel and distributed systems*, New York, NY, ACM, 1990, 211-218.
Ghazal, Ahmad et al., "Outer Join Elimination in the Teradata RDBMS", *DEXA*, 2004, 730-740.
Larson, Per-Ake et al., "View Matching for Outer-Join Views", *Proceedings of the 31st VLDB Conference*, Trondheim, Norway, (2005),445-456.
Bernstein, Philip A., et al., "Query Processing in a System for Distributed Databases (SDD-1)", *ACM Transactions on Database Systems*, vol. 6, No. 4, (Dec. 1981),602-625.
Xu, Yu et al., "Efficient outer join data skew handling in parallel DBMS", *VLDB '09*, Aug. 24-28, Lyon, France, (2009).
Xu, Yu et al., "A New Algorithm for Small-Large Table Outer Joins in Parallel DBMS", *ICDE*, Mar. 2, 2010.

\* cited by examiner

*Primary Examiner* — Jean B Fleurantin
(74) *Attorney, Agent, or Firm* — Howard Speight

(57) ABSTRACT

A small table S is outer joined to a large table L on a join condition on a database system with a plurality B of parallel units (PUs). S and L are partitioned across the PUs. Each row in S has a unique row-id. Each row of S is duplicated on all PUs to form $S_{dup}$. On each PU, dangling rows in S that do not have a match in L under the join condition are identified and the row-ids of the dangling rows are saved in $T_{redis}$. $T_{redis}$ is partitioned across the PUs. P is formed from dangling rows of S whose corresponding entries in $T_{redis}$ appear in all PUs. A result is produced by unioning P and I. I is formed by inner joining non-dangling rows of S with L. The result is saved.

17 Claims, 13 Drawing Sheets

PERFORMING AN OUTER JOIN BETWEEN A SMALL TABLE AND A LARGE TABLE

BACKGROUND

Parallel processing continues to be important in large data warehouses as data warehouse demand continues to expand to higher volumes, greater numbers of users, and more applications. Outer joins are frequently generated by Business Intelligence (BI) tools to query data warehouses powered by parallel database management systems ("DBMSs"). Research has been done on some aspects of optimizing outer joins including outer join elimination, outer join reordering and view matching for outer join views. To the inventors' knowledge, little research has been done on outer join optimization in parallel DBMSs, probably because of the assumption that inner join optimization techniques can be largely applied to outer joins as well.

SUMMARY

In general, in one aspect, the invention features a method for outer joining a small table S to a large table L on a join condition. The method is implemented on a database system with a plurality B of parallel units (PUs). S and L are partitioned across the PUs. Each row in S has a unique row-id. The method includes a) duplicating each row of S on all PUs to form $S_{dup}$. The method further includes b) on each PU, identifying dangling rows in S that do not have a match in L under the join condition and saving the row-ids of the dangling rows in $T_{redis}$. $T_{redis}$ is partitioned across the PUs. The method further includes c) forming P from dangling rows of S whose corresponding entries in $T_{redis}$ appear in all PUs. The method further includes d) producing a result by unioning P and I. I is formed by inner joining non-dangling rows of S with L. The method further includes e) saving the result.

Implementations of the invention may include one or more of the following. Element b may include b1) creating a table T containing the row-ids of rows in $S_{dup}$ that have no matches in L under the join condition, and b2) hash redistributing T on row-ids across the PUs to form $T_{redis}$. Element b1 may include left outer joining $S_{dup}$ and L on each PU in parallel and splitting the result to form I and T on each PU. I may contain the rows of $S_{dup}$ whose row-ids are not in T. Forming I may include inner joining $S_{dup}$ and L on each PU in parallel. Element c may include c1) forming a table N containing the row-ids of rows that appear in T in all PUs, and c2) inner joining N and S and padding the result with nulls for projected columns from L, storing the result in P. Element c1 may include c11) forming the table N of row-ids of rows whose row-ids appear B times in $T_{redis}$. At least one of $S_{dup}$, $T_{redis}$, and P may be a temporary table.

In general, in another aspect, the invention features a database system. The database system includes one or more nodes. The database system further includes a plurality (B) of PUs. Each of the one or more nodes provides access to one or more PUs. The database system further includes a plurality of virtual processes. Each of the one or more PUs provides access to one or more virtual processes. Each virtual process is configured to manage data, including rows from the set of database table rows, stored in one of a plurality of data-storage facilities. The database system further includes a process for outer joining a small table S to a large table L on a join condition. S and L are partitioned across the PUs. Each row in S has a unique row-id. The process includes a) duplicating each row of S on all PUs to form $S_{dup}$. The process further includes b) on each PU, identifying dangling rows in S that do not have a match in L under the join condition and saving the row-ids of the dangling rows in $T_{redis}$. $T_{redis}$ is partitioned across the PUs. The process further includes c) forming P from dangling rows of S whose corresponding entries in $T_{redis}$ appear in all PUs. The process further includes d) producing a result by unioning P and I, I being formed by inner joining non-dangling rows of S with L. The process further includes e) saving the result.

In general, in another aspect, the invention features a computer program stored in a computer-readable tangible medium. The computer program is to be executed on a database system with a plurality B of parallel units (PUs). The computer program is for outer joining a small table S to a large table L on a join condition. S and L are partitioned across the PUs. Each row in S has a unique row-id. The program includes executable instructions that cause a computer to a) duplicate each row of S on all PUs to form $S_{dup}$. The program further includes executable instructions that cause the computer to b) on each PU, identify dangling rows in S that do not have a match in L under the join condition and save the row-ids of the dangling rows in $T_{redis}$, $T_{redis}$ being partitioned across the PUs. The program further includes executable instructions that cause the computer to c) form P from dangling rows of S whose corresponding entries in $T_{redis}$ appear in all PUs. The program further includes executable instructions that cause the computer to d) produce a result by unioning P and I, I being formed by inner joining non-dangling rows of S with L. The program further includes executable instructions that cause the computer to e) save the result.

DETAILED DESCRIPTION

Figure 1:
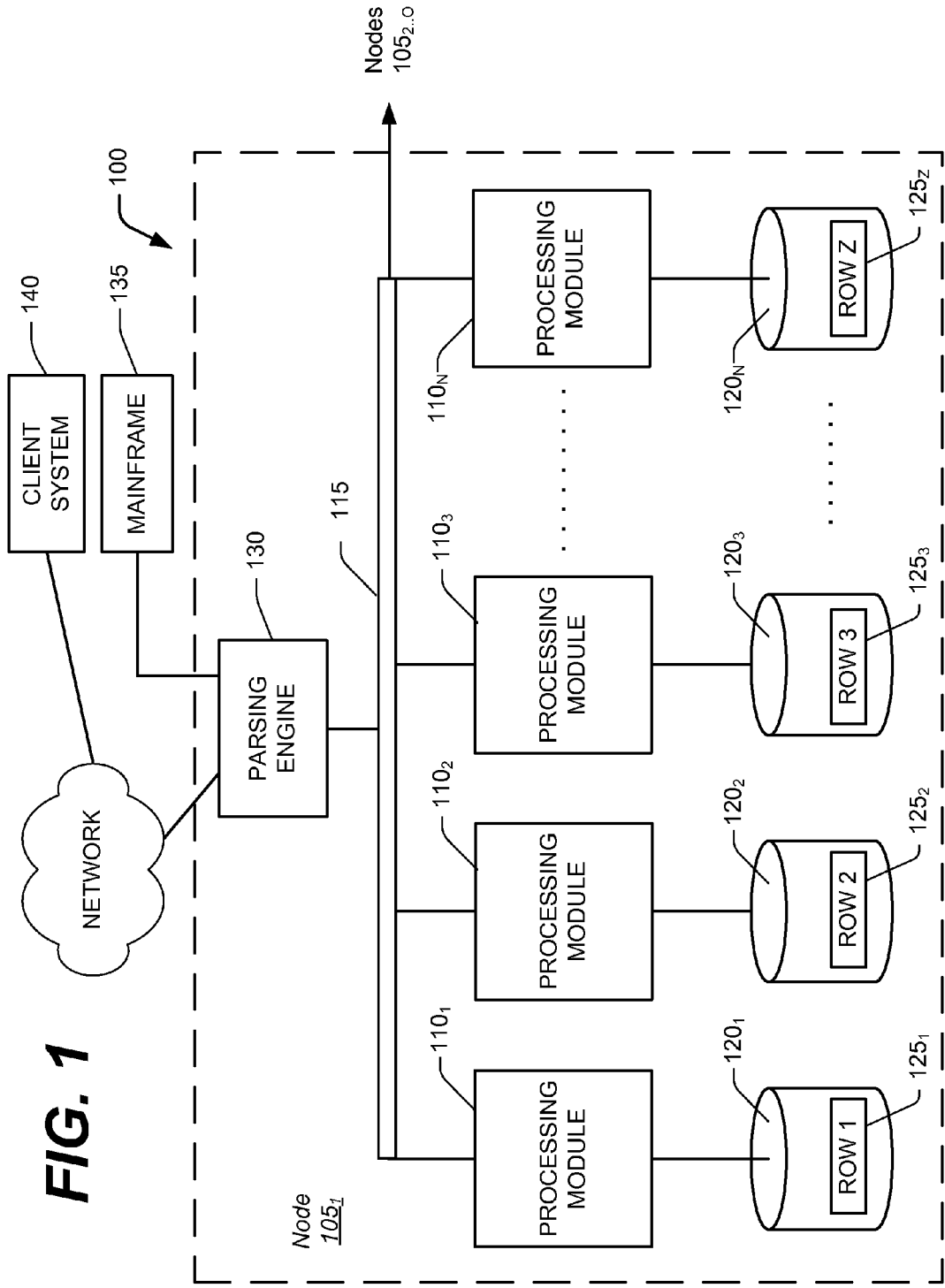
FIG. 1 is one example of a block diagram of a node of a database system.

The technique for performing outer joins disclosed herein has particular application, but is not limited, to large databases that might contain many millions or billions of records managed by a database system ("DBMS") 100, such as a Teradata Active Data Warehousing System available from the assignee hereof. FIG. 1 shows a sample architecture for one node $105_1$ of the DBMS 100. The DBMS node $105_1$ includes one or more processing modules $110_{1 \ldots N}$, connected by a bus, messaging system, and/or some other interconnecting device 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBMS 100 may include multiple nodes $105_2 \ldots$ N in addition to the illustrated node $105_1$, connected by extending the network 115.

The system stores data in one or more tables in the data-storage facilities $120_{1 \ldots N}$. The rows $125_{1 \ldots z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBMS 100 usually receives queries and commands to build tables in a standard format, such as SQL.

In one implementation, the rows $125_{1 \ldots z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

In addition to the physical division of storage among the storage facilities illustrated in FIG. 1, each storage facility is also logically organized. One implementation divides the storage facilities into logical blocks of storage space. Other implementations can divide the available storage space into different units of storage. The logical units of storage can ignore or match the physical divisions of the storage facilities.

Figure 2:
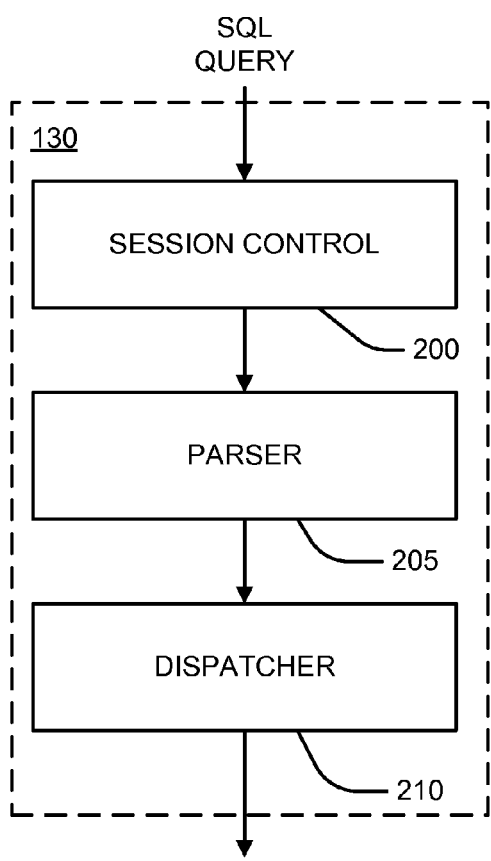
FIG. 2 is one example of a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
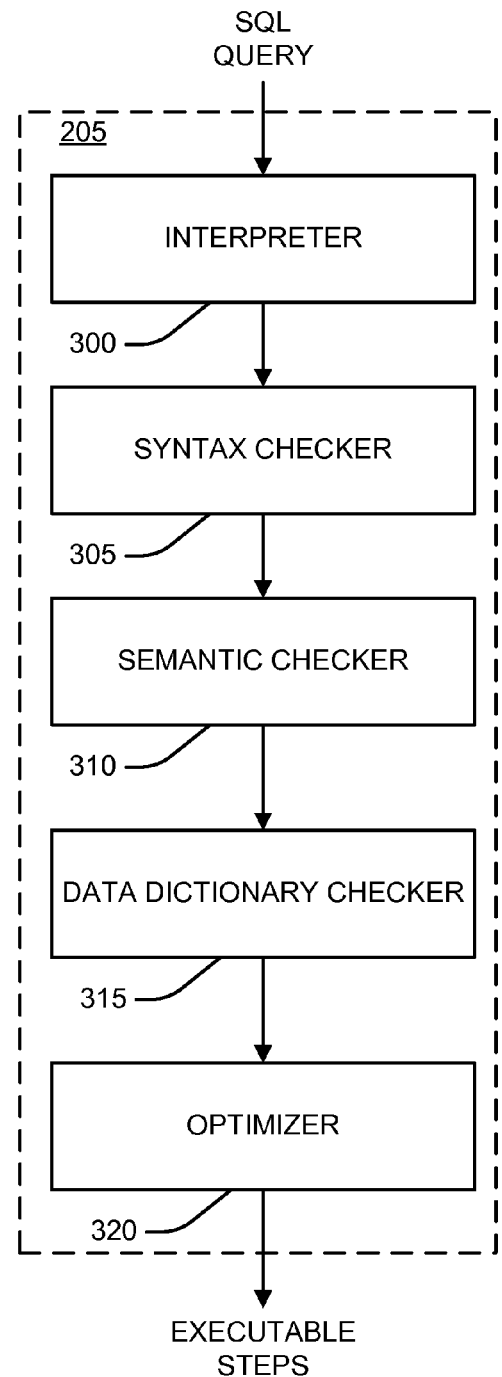
FIG. 3 is a flow chart of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request and produces executable steps to execute the plan. A dispatcher 210 issues commands to the processing modules $110_{1 \ldots N}$ to implement the executable steps.

An example of an outer join between a relatively small table S and a relatively large table L is:

$$S \underset{S.a=L.b}{\overset{LO}{\bowtie}} L$$

where, in one embodiment, the bowtie symbol with the "LO" over it represents a left outer join (for the purposes of this application an "RO" over the bowtie symbol represents a right outer join and an "FO" over the bowtie symbol represents a full outer join). In one embodiment, the letters on either side of the bowtie represent the relations involved in the outer join and the characters below the symbol represent the "on" condition of the outer join. In SQL, one representation of this join is:

select S.x, S.z, L.y (Query 1)
from S left outer join L
on S.a=L.b

In one embodiment, small and large table outer joins are used in BI in many industries to answer business questions. For example, in the telecommunications industry, a small number of phone numbers are frequently left outer joined with a large call detail history table for calling pattern analysis or law enforcement inquiries. In online e-commerce, a small number of customers are often left outer joined with a large transaction table for purchase pattern analysis.

Conventionally, there are two outer join techniques to evaluate a request (which is a broad term that covers database queries and other database functions, such as database utilities), such as Query 1 in a shared nothing parallel DBMS.

In a shared nothing architecture, such as that shown in FIG. 1, multiple nodes communicate via a high-speed interconnect network and each node has its own private memory and disk(s). In modern systems, there are usually multiple virtual processors (collections of software processes) running on each node to take advantage of the multiple CPUs and disks available on each node for further parallelism. These virtual processors, responsible for doing the scans, joins, locking, transaction management, and other data management work, are called Parallel Units (PUs), herein. In one embodiment, the PUs are equivalent to the processing units 110 in FIG. 1.

Relations (or tables) are usually horizontally partitioned across all PUs which allows the system to exploit the I/O bandwidth of multiple disks by reading and writing them in parallel. Hash partitioning is commonly used to partition relations across all PUs. Rows (or "tuples") of a relation are assigned to a PU by applying a hash function to their Partitioning Column. In one embodiment, the Partitioning Column is a Primary Index as discussed above. This Partitioning Column is one or more attributes from the relation, specified by the user or automatically chosen by the system.

Figure 4:
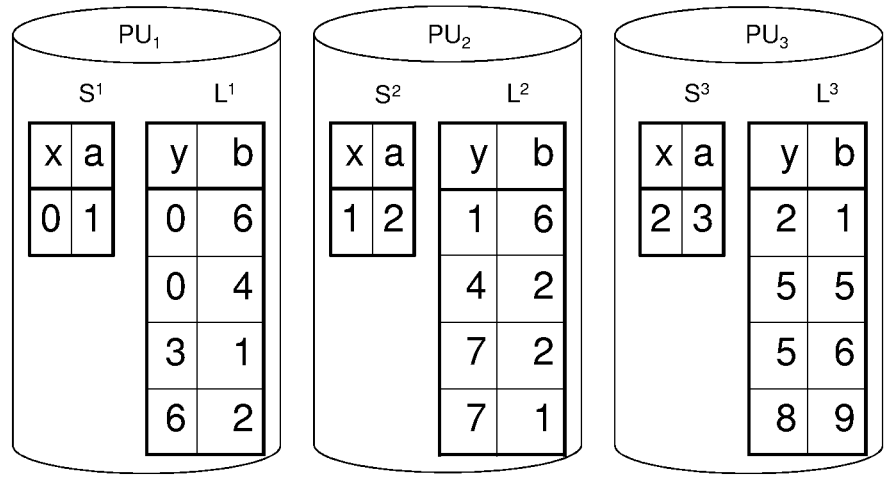
FIGS. 4-13 illustrate the movement of data in the process of performing outer joins.

As an example, FIG. 4 shows the hash partitioning of two relations S(x,a) and L(y,b) on a three-PU system, assuming that the partitioning columns are S.x and L.y respectively, and that the hash function h is:

$$h(i)=i \bmod 3+1 \qquad \text{Equation 1}$$

The hash function h places any tuple with the value i in the partitioning column on the h(i)-th PU. For example, a tuple (x=0, a=1) of S being hash partitioned on x is placed on the first PU since h(0)=1. Similarly, a tuple (y=2,b=1) of L being hash partitioned on y is placed on the third PU since h(2) is 3. The fragment of S (or L) on the i-th PU is denoted $S^i$ (or $L^i$).

The first conventional outer join technique is called the Redistribution Outer Join Algorithm (ROJA) and the second is called the Duplication Outer Join Algorithm (DOJA).

Figure 5:
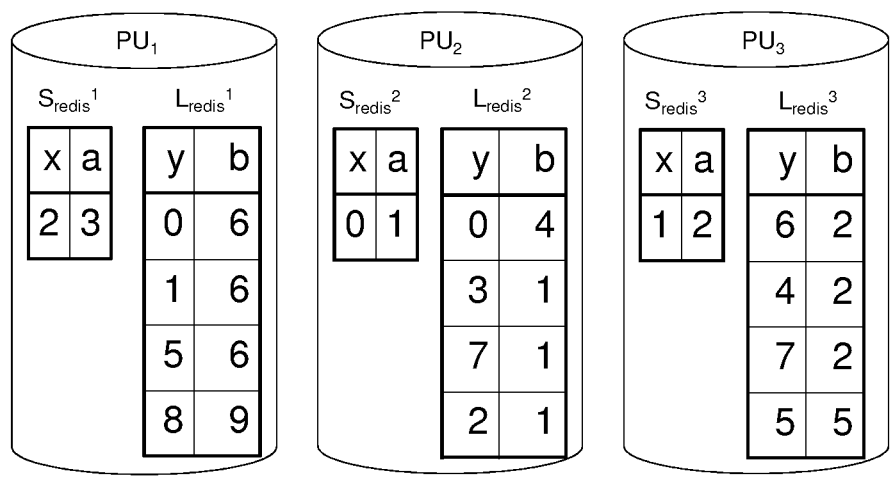

The ROJA technique has two elements. In the first element (assuming Query 1 is being executed and neither S.a nor L.b is the partitioning column), both S and L are redistributed based on the hash values of their join attributes so that matching rows are sent to the same PUs. Note that the base relations are not changed, only copies of the projected rows are redistributed for the evaluation of this query. This redistribution in the first step of the ROJA technique is called hash redistribution. For example, FIG. 5 shows the result of the first step after hash redistributing both S and L on S.a and L.b, respectively, using the h(i) hash function defined above. $S_{redis}$ (or $L_{redis}$) denotes the spool on the i-th PU that contains all rows of S (or L) hash redistributed to the i-th PU from all PUs. These include rows from $S^i$ ($L^i$). If a relation's join attribute is its partitioning column, there is no need to hash redistribute that relation. When both relations' join attributes are their partitioning columns, the first step of the redistribution is not needed. In the second element of the ROJA technique, the outer join operation is performed on each PU in parallel. The outer join can be done locally because the first step has put all matching rows from the join relations on the same PUs.

Figure 6:
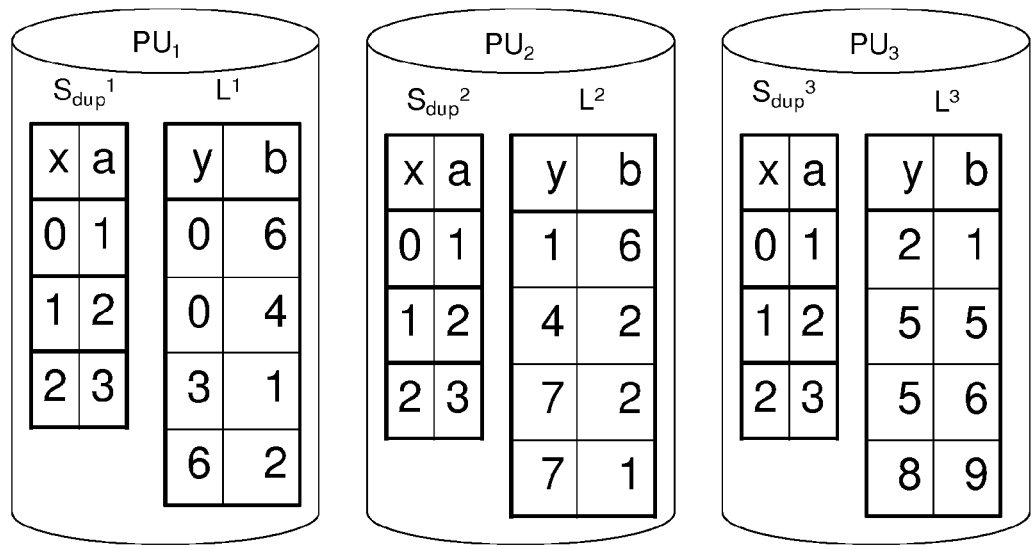
Figure 7:
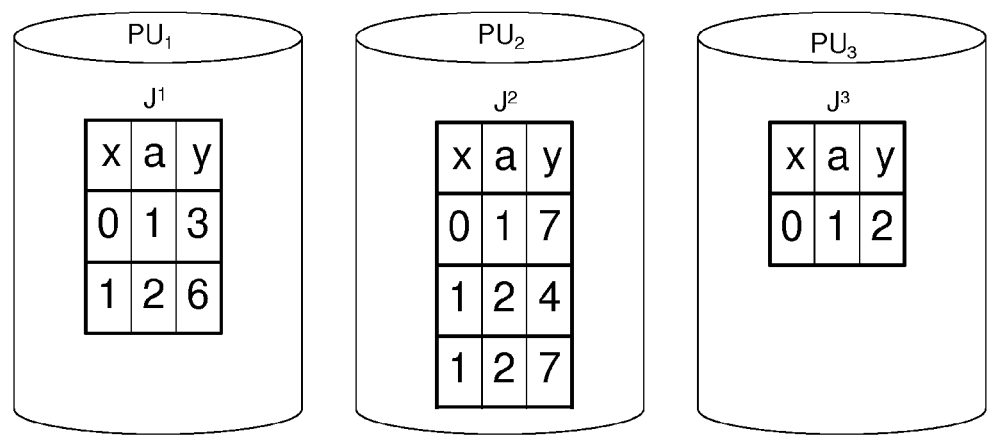
Figure 8:
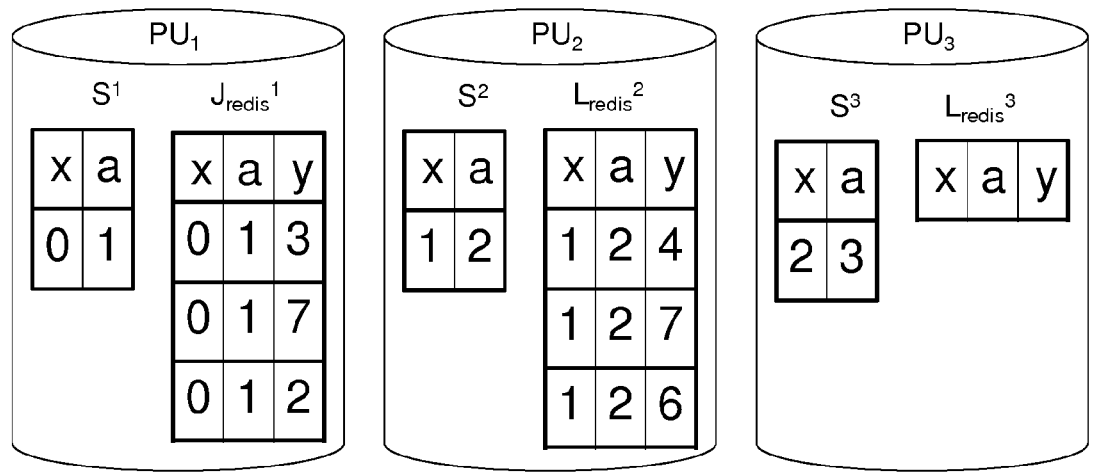
Figure 9:
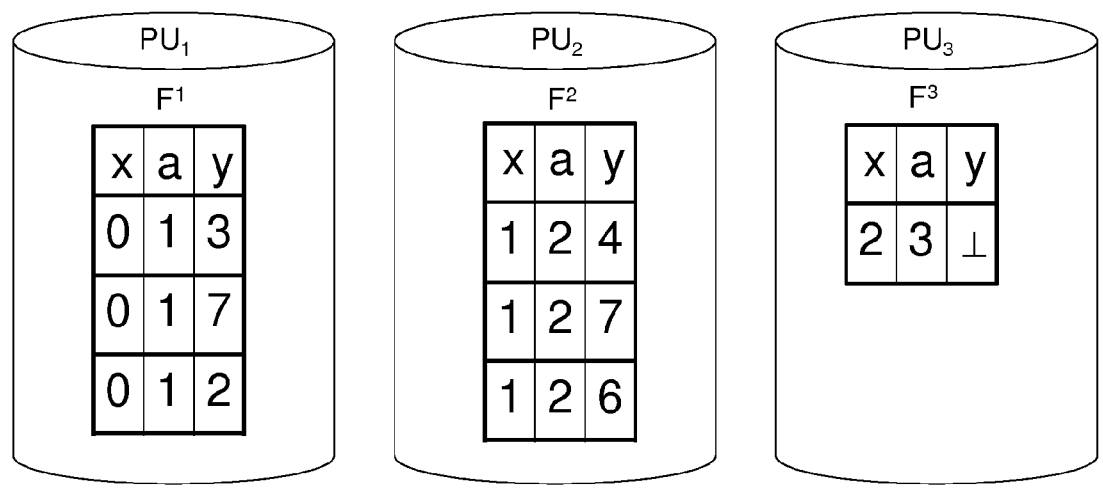

The DOJA technique has four elements. In the first element, tuples of the smaller relation on each PU are duplicated (broadcast) to all PUs so that each PU has a complete copy of the smaller relation. As an example (assuming Query 1 is being executed), FIG. 6 shows the result of duplicating S in FIG. 4 to every PU. In the second element, the duplicated table S is inner joined with L on each PU in parallel and the join results are stored in a temporary table J, as shown in FIG. 7. In the third element, the results of the inner join from the second element are hash redistributed on J.x using the hash function h(i). FIG. 8 shows the result of redistributing the inner join results from FIG. 7. In the fourth element, the table S is left outer joined with the results from the third element. The final results of the left outer join from the last element are shown in FIG. 9. The actual implementation of the DOJA technique, which is more complicated than the above description, has been abbreviated for simplicity.

Although the DOJA technique has been specially designed for small and large table outer joins, the performance of DOJA can be worse than that of ROJA when the inner join cardinality, where "inner join cardinality" refers to the size of the result of the inner join, is high in the second step in the DOJA technique even for small and large table outer joins.
The Duplication and Efficient Redistribution ("DER") Technique In one embodiment, a DER technique is an alternative to the conventional DOJA technique. In one embodiment, the DER technique can outperform the ROJA technique even when the inner join cardinality of the small and large table is high. In one embodiment, the DER technique is designed to replace the conventional DOJA technique to efficiently process parallel small and large table outer joins, motivated by real business problems. In one embodiment, the DER technique does not require major changes to the current implementation of the shared-nothing architecture and is easy to implement. In one embodiment, the DER technique is linearly scalable and efficient.

In one embodiment, the DER technique accomplishes the outer join without redistributing the large table or any intermediate join results whose size depends on the size of the large table.

Assume there are n PUs in the system. The following elements are executed in one embodiment of the DER technique to evaluate the small and large table outer join set out in Query 1.

Element 1

In one embodiment, rows of S on every PU are duplicated to all PUs and are stored in a temporary table $S_{dup}$. FIG. 6 shows the result of Element 1 on the example data in FIG. 4. In one embodiment, this element is the same as the first element in the DOJA technique.

Element 2

Figure 10:
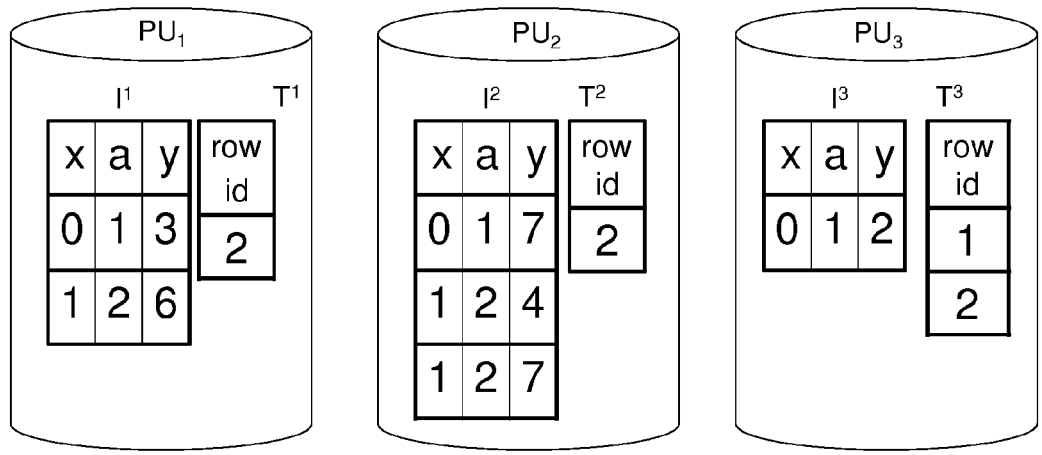

In one embodiment, rows of $S_{dup}$ and L are left outer joined and the results are split into two temporary tables I and T. In one embodiment, I contains rows created from matching rows from $S_{dup}$ and L, and T contains only row-ids (each row in a table has a row-id that is unique for that table) of "dangling" rows of $S_{dup}$, where dangling rows of $S_{dup}$ are rows of $S_{dup}$ having no matching rows in L. FIG. 10 shows the result of splitting the results of the left outer join on every PU. For simplicity of presentation, the values in the partitioning column S.x are used as the row-ids for rows of S in FIG. 10 since the values in the column S.x shown in FIG. 4 are all unique.

In one embodiment, temporary table I is essentially an inner join between $S_{dup}$ and L. In one embodiment, temporary table I is formed by performing an inner join between $S_{dup}$ and L on each PU. In one embodiment, temporary table T is formed using the row-ids of the rows from $S_{dup}$ that did not find matches in the inner join between $S_{dup}$ and L.

Element 3

Figure 11:
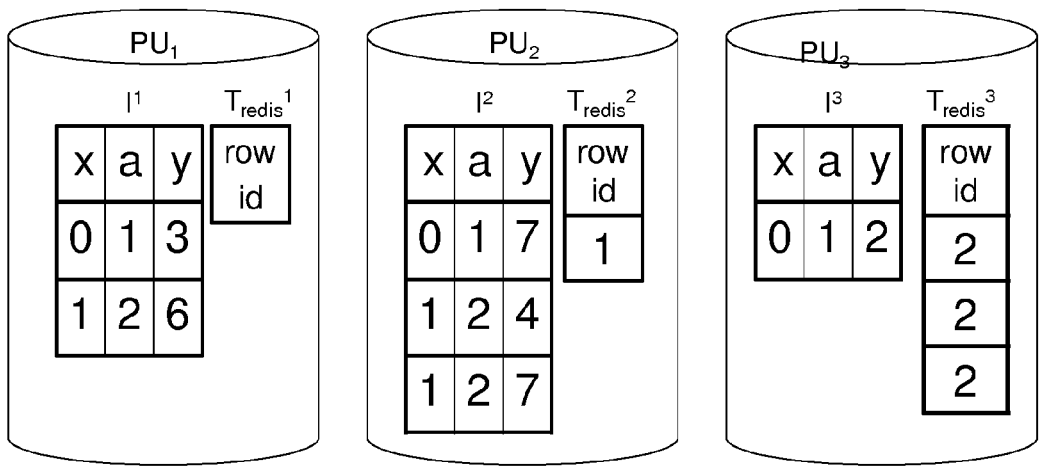

In one embodiment, rows of T are hash redistributed on the row-id values using the h(i) hash function and the results are stored in a temporary table $T_{redis}$. In one embodiment, the temporary table T is not materialized since every row in T is hash redistributed on the fly after it is generated. The result of Element 3 is shown in FIG. 11.

Element 4

Figure 12:
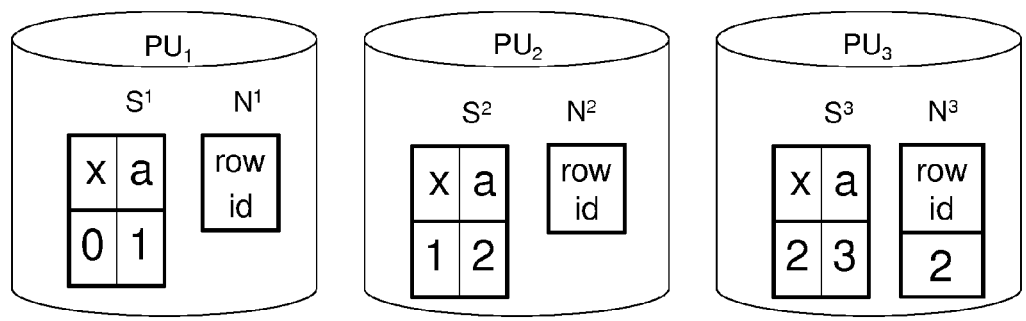

In one embodiment, a temporary table N is computed to contain all row-ids in $T_{redis}$ that appear as many times as the number of PUs. Thus, the row-ids of all dangling rows of S are contained in N. In one embodiment, this step is logical. In one embodiment, the table N is efficiently computed on the fly using a hash table during the hash redistribution of the table T described in Element 3. In the example, N (shown in FIG. 12) contains only one row-id, 2, on the third PU based on the data shown in FIG. 11. Note that 1 is not in N since it only appears once on the second PU (i.e., it does not appear as many times as the number of PUs).

Element 5

Figure 13:
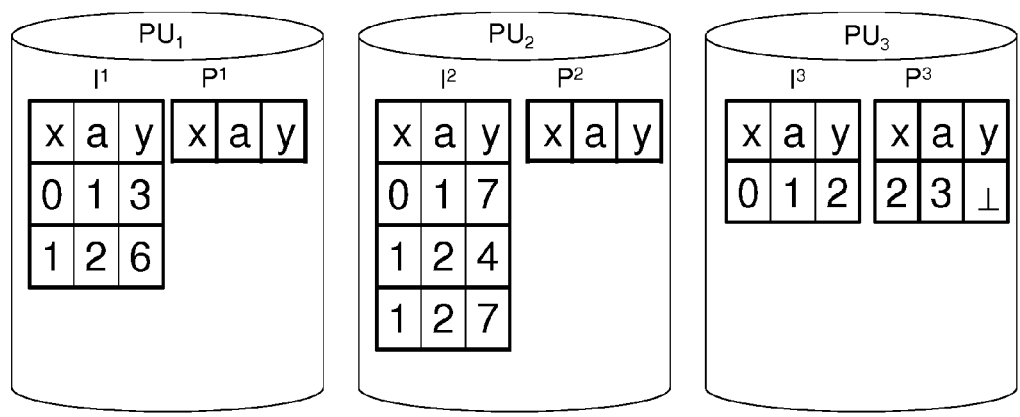

In one embodiment, S and N are inner joined on row-ids and the results are padded with NULLs for the projected column(s) from L (e.g., column L.y which appears in the select clause of Query 1) and the result is stored in a table P, as shown in FIG. 13.

Element 6

In one embodiment, the final results of the left outer join are the union of I and P (shown in FIG. 13). In one embodiment, the union is logical and does not require duplicate removal because the two relations have no rows in common.

Figure 14:
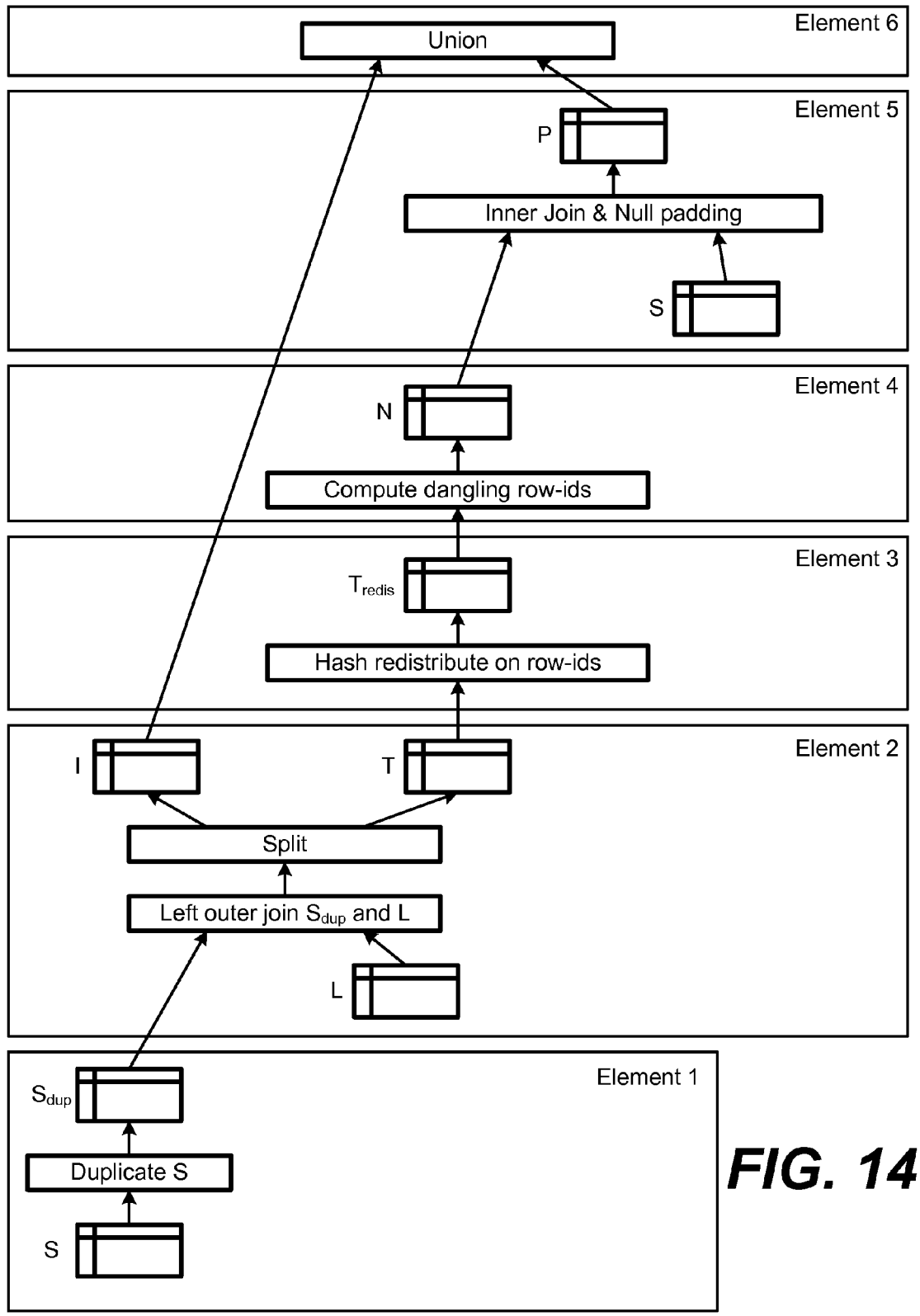
FIG. 14 is a flow chart of the Duplication and Efficient Redistribution ("DER") technique for performing an outer join.

A visual description of the DER technique is shown in FIG. 14.

The Technique is correct because of the following formula.

$$S \overset{LO}{\underset{S.a=L.b}{\bowtie}} L = \left(S \overset{S.a=L.b}{\bowtie} L\right) \cup \left(\left(S - S \overset{S.a=L.b}{\ltimes} L\right) \overset{LO}{\bowtie} \emptyset\right)$$

where:

$$S \overset{S.a=L.a}{\ltimes} L$$

is a semi-join, indicated by the open bowtie, computing the matching rows in S;

$$\left(S \overset{S.a=L.b}{\bowtie} L\right)$$

is an inner join of S and L on S.a=L.b; and $$\overset{LO}{\bowtie} \emptyset$$

is a left outer join with L, storing nulls in the projected columns for non-matching rows from both S and L.

That is, in one embodiment, according to the above formula the left outer join of S and L can be computed as the union of the inner join of S and L and the dangling rows of S padded with NULLs for the projected column(s) from L. In one embodiment of the second element of the DER technique, the results of inner joining S and L are stored in the table I. Potential dangling rows of S (i.e., rows of S that are dangling in at least one PU) are stored in T. The fourth element identifies the real dangling rows of S (i.e., rows of S that are dangling in all PUs). Although, in one embodiment, by element 2 it is already known which rows of S have matching rows in L (via the left outer join), it is not yet known which rows of S have no matching rows in L because a row of S having no matching rows in L on one PU could have matching rows in L on other PUs. For example, though the tuple (x=1, a=2) of S on PU3 in FIG. 6 has no matching rows in L on the PU3 in performing the second element in the DER technique, the tuple (x=1, a=2) is not a dangling row of S globally since it has matching rows in L on other PUs. All elements in the DER technique after the second element are used to compute the dangling rows of S.

The DER technique is applicable to full outer joins. For example, if the left outer join in Query 1 is changed to a full outer join, the only change in the DER technique is that the left outer join method in Element 2 is changed to a full outer join and dangling rows of L are kept in the intermediate table I as well. The DER technique applies to right outer joins because such joins can be rewritten to equivalent left outer joins.

In one embodiment, when a cost-based optimizer chooses which technique from ROJA and DOJA to evaluate the following left outer join:

$$S \overset{LO}{\underset{S.a=L.b}{\bowtie}} L$$

the optimizer considers the inner join cardinality in the second step of the DOJA technique in the cost formula for the DOJA technique. In one embodiment, when the optimizer chooses the DOJA technique based on its inner join cardinality estimation, the performance of the DOJA technique can be worse than that of the ROJA technique when the estimate is incorrect. In comparison with the DOJA technique, in one embodiment the DER technique is a "true" small-large outer join technique in that when the optimizer chooses between ROJA and DER to evaluate an outer join, the inner join cardinality does not affect the optimizer's decision. This is because, in one embodiment, the inner join cardinality affects the computing costs of both ROJA and DER, but has no effect on the redistribution cost in the DER technique. However, in one embodiment, increasing inner join cardinality increases the computing costs of both ROJA and DOJA, but also increases the redistribution cost in the DOJA technique. Therefore, whether DOJA actually outperforms ROJA depends on the inner join cardinality which is sometimes difficult to accurately estimate, as described below in the in section on experimental data. On the other hand, in one embodiment, whether DER outperforms ROJA mainly depends on the sizes of the small and large tables which usually can be accurately estimated.

In one embodiment, one issue arises when the optimizer chooses DER over ROJA. A cost based optimizer will choose the DER technique over the ROJA technique when it determines the cost of applying the DER technique is smaller than the cost of applying the ROJA technique, considering factors such as the number of PUs, networking bandwidth, sizes of the joined tables, characteristics of I/O configurations in the system.

In a traditional, non-partitioned, DBMS running on symmetrical multi-processing ("SMP") machines, there is almost no noticeable performance difference between an outer join and an inner join on the same tables. However, it is not always the case with a peer DBMS (or "PDBMS") running on massive parallel processing ("MPP") systems. While outer joining two tables of similar size using the ROJA technique has about the same performance as inner joining the same tables in PDBMS, outer joining a small table and a large table using the conventional DOJA technique can be significantly slower than inner joining the same two tables due to the extra cost of redistributing the inner join results (in the second element) in the DOJA technique, especially when the inner join cardinality is high. Since, in one embodiment, the dominant cost of the DER technique for a small and large outer join is the inner join cost in the second element, the performance of outer joining a small and a large table using the DER technique is almost the same as the performance of the corresponding inner join. In all experiments reported in the experimental section below, in one embodiment, the performance of the DER technique and the performance of the corresponding inner join are almost the same. Thus, the running times of the inner joins are not included. With the introduction of the DER technique, customers of parallel data warehouses will no longer experience significant performance differences between outer joins and inner joins which can be quite surprising when they come from a non-parallel computing environment.

Experimental Evaluation

The inventors performed experiments to compare the performance and scalability of the DER technique and the conventional DOJA and ROJA techniques. The inventors used a test system in which each node had 4 Pentium IV 3.6 GHz CPUs (Central Processing Units), 4 GB memory, and 2 dedicate. 146 GB hard drives. Each node was configured to run 2 PUs to take advantage of the two hard drives. Experiments were run on 2-node, 4-node and 8-node system configurations. Two groups of experiments were conducted on each system configuration. In both groups of experiments, the size of the small table S was the same while the size of the large table in the second group of experiments was 5 times as large as the size of the large table in the first group of experiments.

In the first group of experiments on the 2-node system configuration (4 PUs), 20 rows were generated for the small table S and 25 million rows were generated for the large table L and Query 1 was executed. The inner join cardinality of S and L was incremented from 0 percent to 100 percent in 10 percent increments by controlling the values in S.a and L.b while keeping the sizes of S and L constant (20 rows and 25 million rows respectively). An inner join cardinality of 10% means:

$$\left| S \stackrel{S.a=L.b}{\bowtie} L \right| = 10\% \; |L|$$

Figure 15:
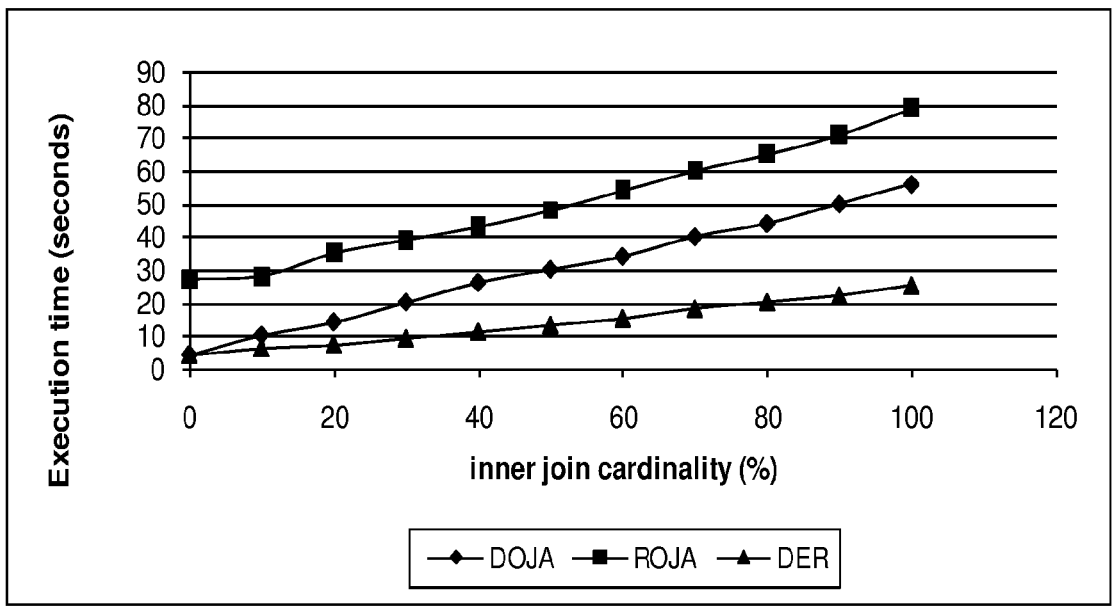
FIGS. 15-22 illustrate experimental data showing the performance of the DER technique versus conventional techniques.

The execution times of the three techniques, shown in FIG. 15, indicates that while the execution times of all techniques increase as the inner join cardinality increases, the performance gap between the DER technique and the two conventional techniques also increases.

Figure 16:
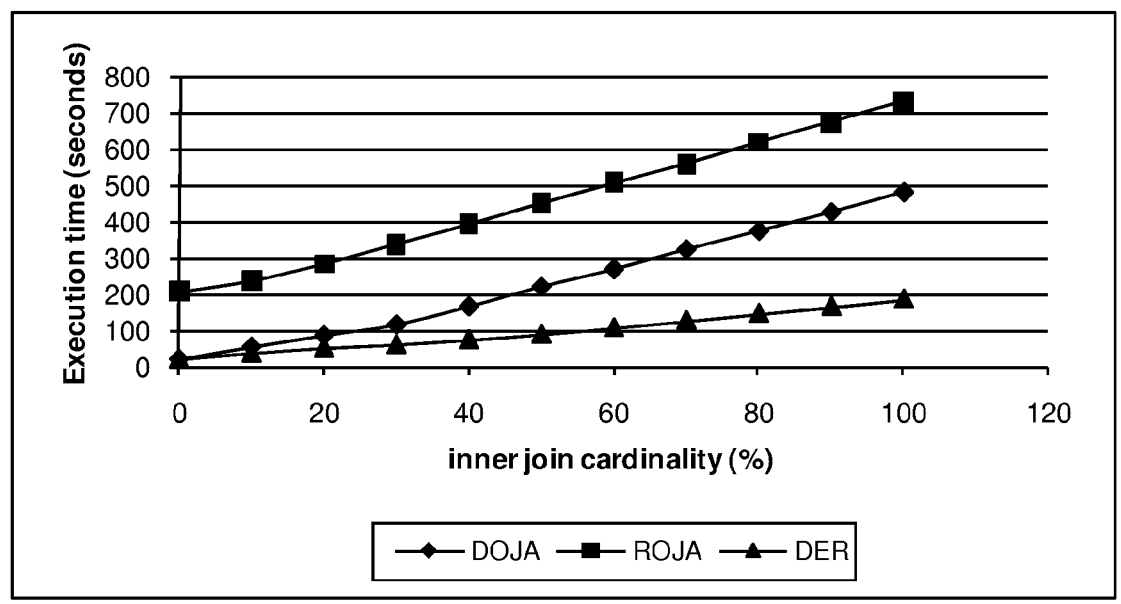

In the second group of experiments on the 2-node system configuration, the size of L was increased from 25 million rows in the first group of experiments to 125 million rows, and the size of S was kept at 20 rows. FIG. 16 shows the execution times of the three techniques. Again, as the inner join cardinality increases, the performance gap between the DER technique and the other two techniques also increases.

Figure 17:
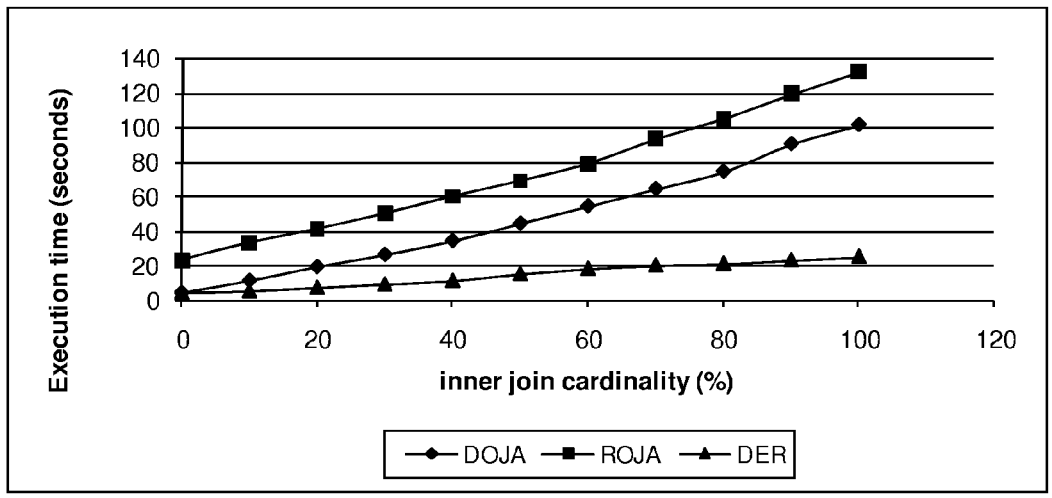

In the first group of experiments on the 4-node system configuration, the size of L was doubled from 25 million rows in the first group of experiments on the 2-node system configuration to 50 million rows. The small table remained at 20 rows. FIG. 17 shows the execution times of the three techniques.

Figure 18:
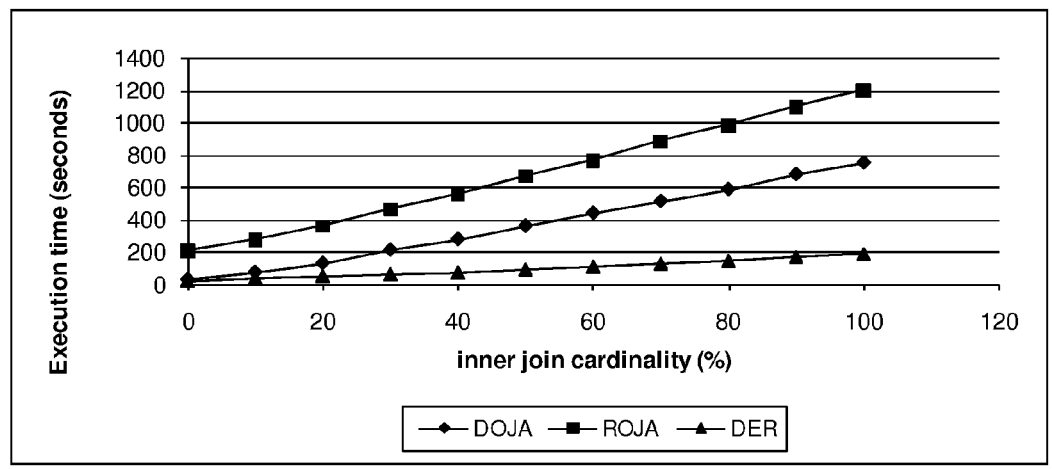

In the second group of experiments on the 4-node system configuration, the size of L was changed from 50 million rows in the first group of experiments to 250 million rows. The small table remained at 20 rows. FIG. 18 shows the execution times of the three techniques.

Figure 19:
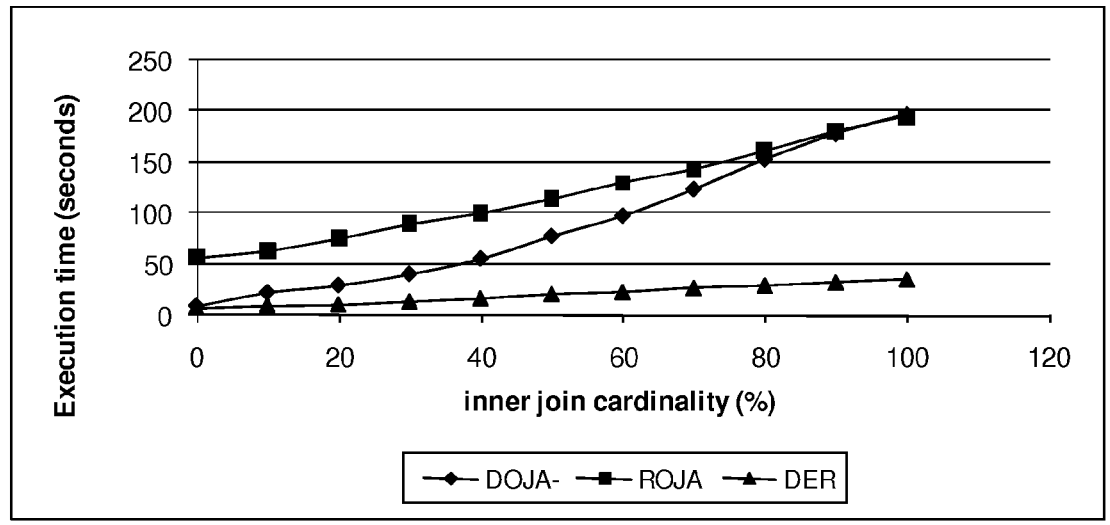

In the first group of experiment on the 8-node system configuration, the size of L was doubled from 50 million rows in the first group of experiments on the 4-node system configuration to 100 million rows. The small table remained at 20 rows. FIG. 19 shows the execution times of the three techniques.

Figure 20:
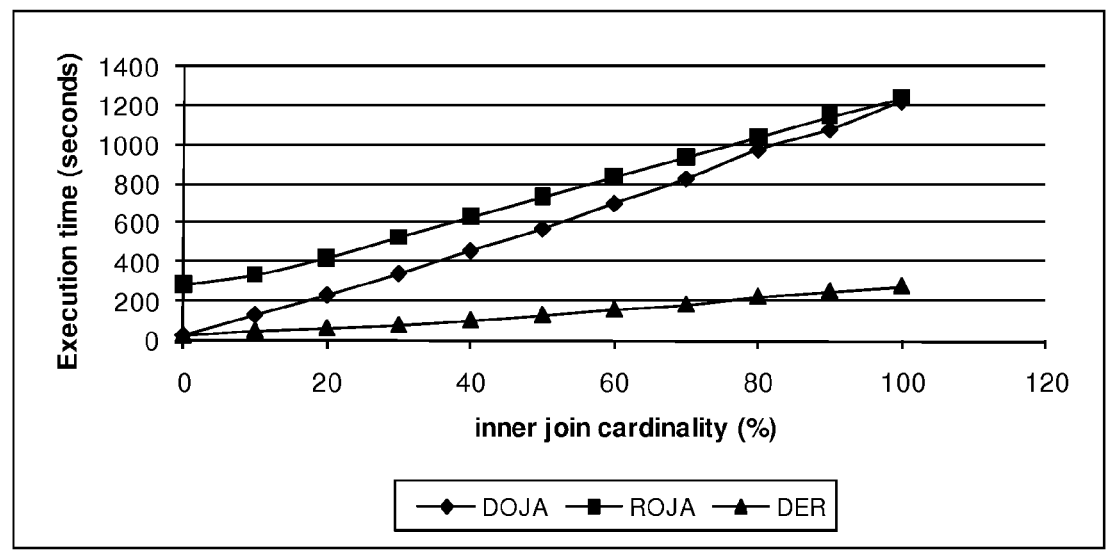

In the second group of experiments on the 8-node system configuration, the size of L was changed from 100 million rows in the first group of experiments to 500 million rows. The small table remained at 20 rows. FIG. 20 shows the execution times of the three techniques.

Figure 21:
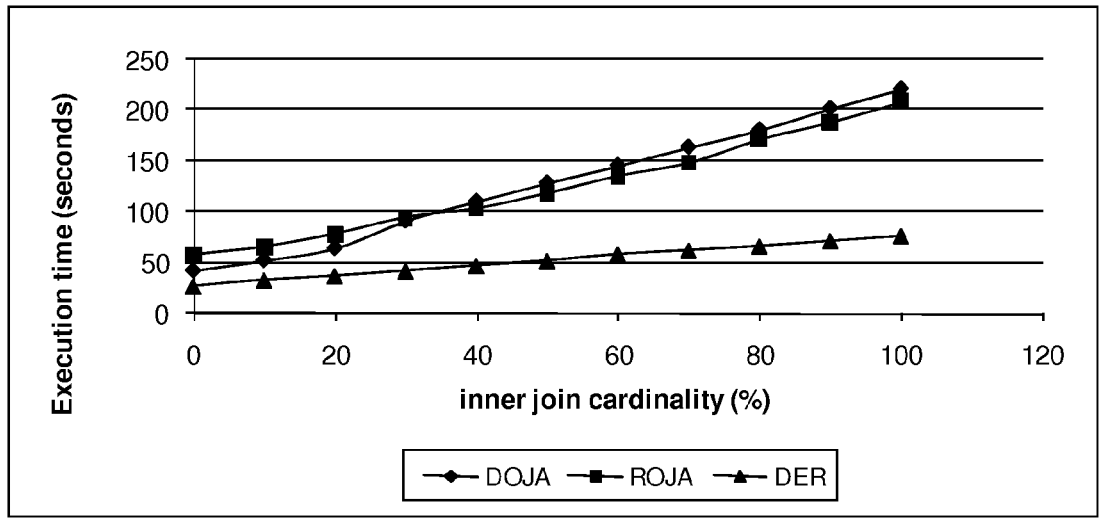
Figure 22:
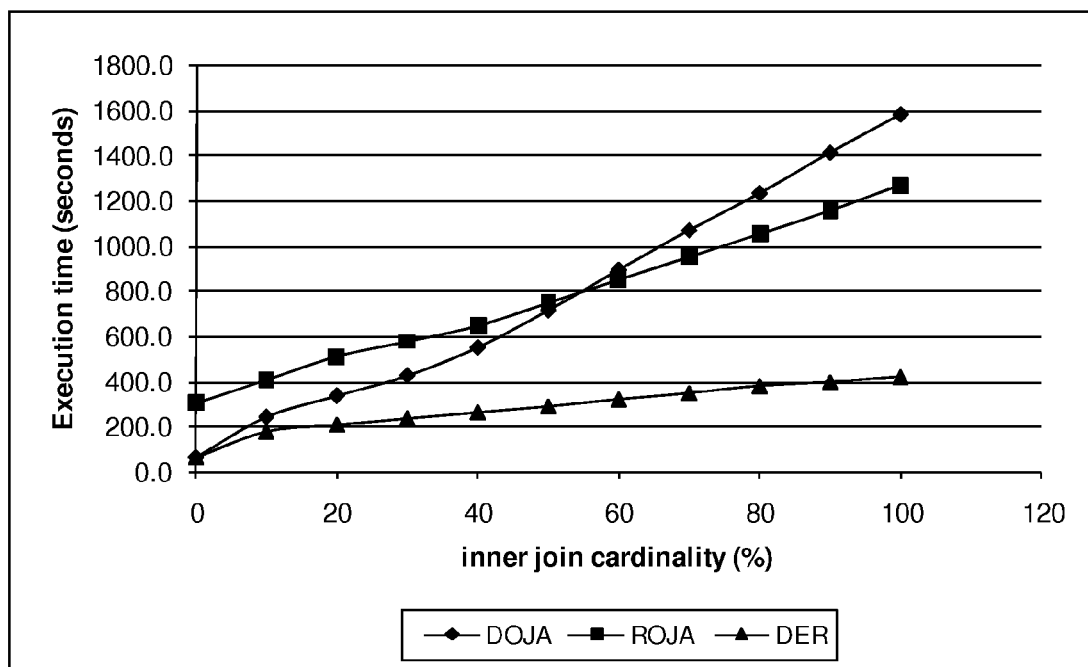

In large data warehouses, a table of millions of rows can be regarded as a "small" table when joined to a larger table and thus the DER technique can be applied. To illustrate this point, additional experiments were run, as shown in FIGS. 21 and 22, in which the size of the small table was increased to 1 million rows. The size of the large table is 100 million rows in FIG. 21 and 500 million rows in FIG. 2. The DER technique outperformed the two conventional techniques in both experiments. Note that the ROJA technique outperformed the DOJA technique when the inner join cardinality is more than 30% in FIG. 21, and when the inner join cardinality is more than 60% in FIG. 22, due to the reasons discussed above. ROJA starts to outperform DOJA sooner in the experiments in FIG. 21 than in FIG. 22 because the small table is "smaller" relative to the large table in FIG. 22 than in FIG. 21. Thus, it takes higher inner join cardinality in FIG. 22 for ROJA to outperform DOJA.

Overall, the experiments demonstrate that the DER technique significantly outperforms the DOJA and ROJA techniques on different system configurations for small and large table outer joins and scales linearly.

Figure 23:
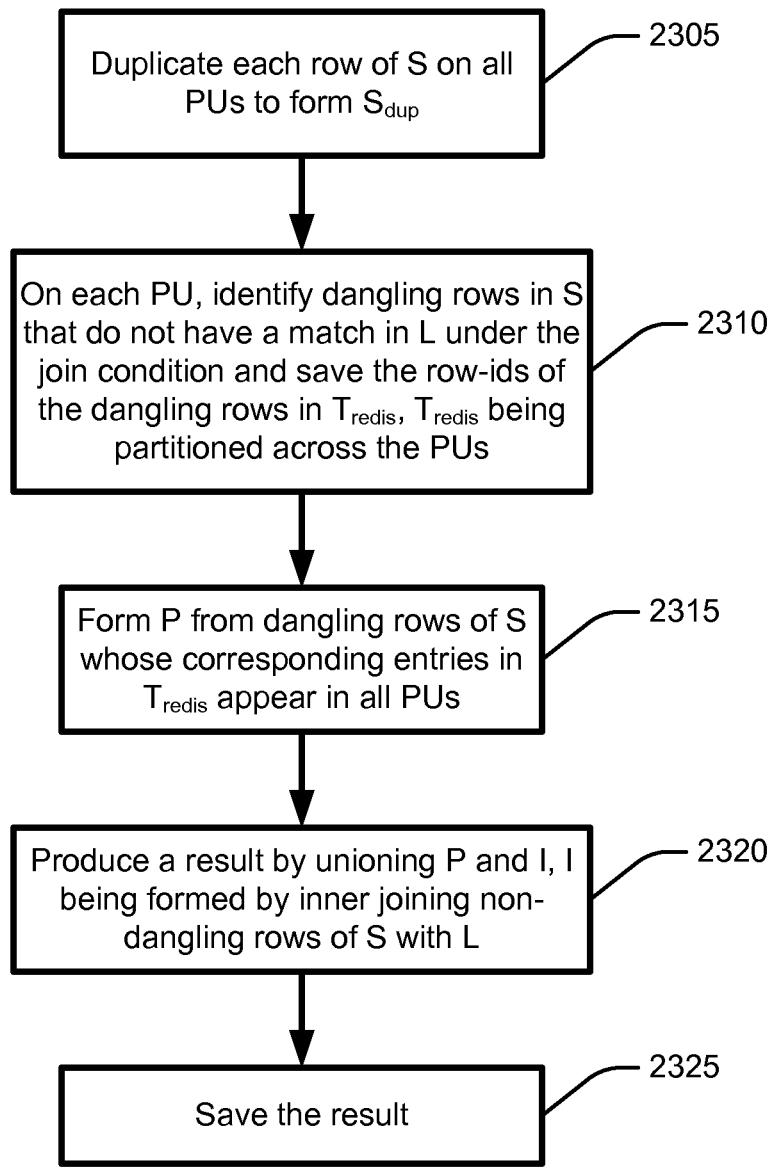
FIG. 23 is a flow chart.

In one embodiment, illustrated in FIG. 23, the process of executing a query, such as Query 1, involving an outer join of a small table S to a large table L on a join condition (e.g., S.a=L.b in Query 1) begins by duplicating each row of S on all PUs to form $S_{dup}$ (block 2305). In one embodiment, dangling rows in S, i.e. rows in S that do not have a match in L under the join condition, are identified on each PU and the row-ids of the dangling rows are saved in $T_{redis}$, $T_{redis}$ being partitioned across the PUs (block 2310). In one embodiment, this is done by creating a table T containing the row-ids of rows in $S_{dup}$ that have no matches in L under the join condition and hash redistributing T on row-ids across the PUs to form $T_{redis}$, using, for example, the hash redistribution function described above. In one embodiment, T is formed by left outer joining $S_{dup}$ and L on each PU in parallel and splitting the result to form I and T on each PU, I containing the rows of $S_{dup}$ that are not in T.

In one embodiment, P is formed from dangling rows of S whose corresponding entries in $T_{redis}$ appear in all PUs (block 2315). In one embodiment, P is formed by forming a table N containing the row-ids of rows that appear in $T_{redis}$ in all PUs and inner joining N and S and padding the result with nulls for projected columns from L (e.g. L.y, as found in the select clause of Query 1). In one embodiment, table N is formed from row-ids of rows whose row-ids appear B times in $T_{redis}$.

A result is formed by unioning P and I, I being formed by inner joining non-dangling rows of S with L (block 2320). In one embodiment I is formed by inner joining $S_{dup}$ and L on each PU in parallel. The result is then saved (block 2325).

In one embodiment, at least one of $S_{dup}$, $T_{redis}$, P, N, T, and I is a temporary table.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-based method for outer joining a small table S to a large table L on a join condition, the method being implemented on a computer database system with a plurality B of parallel units (PUs), S and L being partitioned across the PUs, each row in S having a unique row-id, executed by at least one processor, the method comprising:

a) the computer database system duplicating each row of S on all PUs to form $S_{dup}$;

b) on each PU, the computer database system identifying dangling rows in S, wherein the dangling rows in S are those rows in S that do not have a match in L under the join condition and saving the row-ids of the dangling rows in $T_{redis}$, $T_{redis}$ being partitioned across the PUs;

c) the computer database system forming P from dangling rows of S whose corresponding entries in $T_{redis}$ appear in all PUs by:

c1) forming a table N containing the row-ids of rows that appear in T in all PUs, and c2) inner joining N and S and padding the result with nulls for projected columns from L, storing the result in P;

d) the computer database system producing a result by unioning P and I, I being formed by inner joining non-dangling rows of S with L; and e) the computer database system saving the result.

2. The method of claim 1 wherein element b comprises:
b1) creating a table T containing the row-ids of rows in $S_{dup}$ that have no matches in L under the join condition; and
b2) hash redistributing T on row-ids across the PUs to form $T_{redis}$.

3. The method of claim 2 wherein element b1 comprises:
left outer joining $S_{dup}$ and L on each PU in parallel and splitting the result to form I and T on each PU, I containing the rows of $S_{dup}$ whose row-ids are not in T.

4. The method of claim 1 wherein forming I comprises:
inner joining $S_{dup}$ and L on each PU in parallel.

5. The method of claim 1 wherein element c1 comprises:
c11) forming the table N of row-ids of rows whose row-ids appear B times in $T_{redis}$.

6. The method of claim 1 wherein:
at least one of $S_{dup}$, $T_{redis}$, and P is a temporary table.

7. A computer database system including a processor comprising:
one or more nodes;
a plurality (B) of PUs, each of the one or more nodes providing access to one or more PUs;
a plurality of virtual processes, each of the one or more PUs providing access to one or more virtual processes;
each virtual process configured to manage data, including rows from the set of database table rows, stored in one of a plurality of data-storage facilities;
a process for outer joining a small table S to a large table L on a join condition, S and L being partitioned across the PUs, each row in S having a unique row-id, the process comprising:
a) the computer database system duplicating each row of S on all PUs to form $S_{dup}$;
b) on each PU, the computer database system identifying dangling rows in S, wherein the dangling rows in S are those rows in S that do not have a match in L under the join condition and saving the row-ids of the dangling rows in $T_{redis}$, $T_{redis}$ being partitioned across the PUs;
c) the computer database system forming P from dangling rows of S whose corresponding entries in $T_{redis}$ appear in all PUs by:
c1) forming a table N containing the row-ids of rows that appear in T in all PUs, and
c2) inner joining N and S and padding the result with nulls for projected columns from L, storing the result in P;

d) the computer database system producing a result by unioning P and I, I being formed by inner joining non-dangling rows of S with L; and e) the computer database system saving the result.

8. The database system of claim 7 wherein element b comprises:
b1) creating a table T containing the row-ids of rows in $S_{dup}$ that have no matches in L under the join condition; and
b2) hash redistributing T on row-ids across the PUs to form $T_{redis}$.

9. The database system of claim 8 wherein element b1 comprises:
left outer joining $S_{dup}$ and L on each PU in parallel and splitting the result to form I and T on each PU, I containing the rows of $S_{dup}$ whose row-ids are not in T.

10. The database system of claim 7 wherein forming I comprises:
inner joining $S_{dup}$ and L on each PU in parallel.

11. The database system of claim 7 wherein element c1 comprises: c11) forming the table N of row-ids of rows whose row-ids appear B times in $T_{redis}$.

12. The database system of claim 7 wherein:
at least one of $S_{dup}$, $T_{redis}$, and P is a temporary table.

13. A computer program, stored in a non-transitory tangible computer-readable medium, for outer joining a small table S to a large table L on a join condition, the computer program to be executed on a database system with a plurality B of parallel units (PUs), S and L being partitioned across the PUs, each row in S having a unique row-id, the program comprising executable instructions that cause a computer to:
a) duplicate each row of S on all PUs to form $S_{dup}$;
b) on each PU, identify dangling rows in S, wherein the dangling rows in S are those rows in S that do not have a match in L under the join condition and save the row-ids of the dangling rows in $T_{redis}$, $T_{redis}$ being partitioned across the PUs;
c) form P from dangling rows of S whose corresponding entries in $T_{redis}$ appear in all PUs by:
c1) forming a table N containing the row-ids of rows that appear in T in all PUs, and
c2) inner joining N and S and padding the result with nulls for projected columns from L, storing the result in P;
d) produce a result by unioning P and I, I being formed by inner joining non-dangling rows of S with L; and
e) save the result.

14. The computer program of claim 13 wherein, when performing element b, the computer:
b1) creates a table T containing the row-ids of rows in $S_{dup}$ that have no matches in L under the join condition; and
b2) hash redistributes T on row-ids across the PUs to form $T_{redis}$.

15. The computer program of claim 14 wherein, when performing element b1, the computer:
left outer joins $S_{dup}$ and L on each PU in parallel and splits the result to form I and T on each PU, I containing the rows of $S_{dup}$ whose row-ids are not in T.

16. The computer program of claim 13 wherein, when forming I, the computer:
inner joins $S_{dup}$ and L on each PU in parallel.

17. The computer program of claim 13 wherein, when performing element c1, the computer: c11) forms the table N of row-ids of rows whose row-ids appear B times in $T_{redis}$.

* * * * *